United States Patent
Young et al.

(10) Patent No.: US 11,328,193 B2
(45) Date of Patent: May 10, 2022

(54) OPTICALLY DERIVING INFORMATION FROM A SECURITY ELEMENT

(71) Applicant: QUANTUM BASE LIMITED, Stockport (GB)

(72) Inventors: Robert James Young, Stockport (GB); David Ian Howarth, Stockport (GB); Nema Mohamed Safwat Ibrahim Abdelazim, Stockport (GB)

(73) Assignee: Quantum Base Limited, Stockport (GB)

( * ) Notice: Subject to any disclaimer, the term of this patent is extended or adjusted under 35 U.S.C. 154(b) by 0 days.

(21) Appl. No.: 17/060,294

(22) Filed: Oct. 1, 2020

(65) Prior Publication Data

US 2021/0103787 A1 Apr. 8, 2021

(30) Foreign Application Priority Data

Oct. 3, 2019 (GB) .................................. 1914263

(51) Int. Cl.
*G06K 19/06* (2006.01)
*G06K 7/10* (2006.01)
(Continued)

(52) U.S. Cl.
CPC ..... *G06K 19/06037* (2013.01); *B42D 25/305* (2014.10); *B42D 25/309* (2014.10);
(Continued)

(58) Field of Classification Search
CPC ........ G06K 19/00; G06K 19/04; G06K 19/06; G06K 19/0646
(Continued)

(56) References Cited

U.S. PATENT DOCUMENTS

| 2008/0149850 A1 | 6/2008 | Tardif et al. |
| 2009/0033932 A1 | 2/2009 | Gibson |

(Continued)

FOREIGN PATENT DOCUMENTS

EP 1491350 A2 12/2004

OTHER PUBLICATIONS

GB Search Report for corresponding GB Application No. GB1914263.7 dated Mar. 23, 2020, 1 page.

*Primary Examiner* — Edwyn Labaze
(74) *Attorney, Agent, or Firm* — Hoffman Warnick LLC

(57) ABSTRACT

According to a first aspect of the invention, there is provided a method of deriving information from an optically readable security element, the method comprising: optically reading the optically readable security element, the optically readable security element comprising one or more optically readable structures, optically readable in response to excitation of the one or more optically readable structures, the one or more optically readable structures being arranged to interact with one or more proximal structures of the optically readable security element, the interaction being such that an excitation-emission relationship for the one or more optically readable structures interacting with the one or more proximal structures, is different to an excitation-emission relationship for the one or more optically readable structures and the one or more proximal structures in isolation; the reading comprising: determining data indicative of an optical property of the optically readable security element using first emission electromagnetic radiation, emitted in response to first excitation of the one or more optically readable structures; and deriving the information from the determined data.

21 Claims, 7 Drawing Sheets

(51) Int. Cl.
*B42D 25/305* (2014.01)
*B42D 25/309* (2014.01)
*B42D 25/333* (2014.01)

(52) U.S. Cl.
CPC ............ *B42D 25/333* (2014.10); *G06K 7/10* (2013.01); *G06K 2007/10485* (2013.01)

(58) Field of Classification Search
USPC ..................... 235/494, 487, 375, 435, 454
See application file for complete search history.

(56) References Cited

U.S. PATENT DOCUMENTS

| | | | |
|---|---|---|---|
| 2013/0320087 A1* | 12/2013 | Moran | G06K 19/14 235/440 |
| 2014/0197241 A1 | 7/2014 | Lawandy | |
| 2015/0294177 A1* | 10/2015 | Paeschke | H04N 5/2256 382/165 |
| 2017/0016826 A1* | 1/2017 | Norton | C09K 11/7774 |
| 2019/0095668 A1* | 3/2019 | Gaathon | G01N 21/64 |

* cited by examiner

OPTICALLY DERIVING INFORMATION FROM A SECURITY ELEMENT

The present invention relates generally to a method of deriving information from an optically readable security element, and to a related system. The invention also relates to an associated optically readable security element.

Optically readable security elements are known, for example in the form of holograms, bar codes, 2D codes (such as QR codes), and so on. The security provided by such an element might range from the provision of a unique identifier, or to provide or prove a degree of authentication of the element or a device to which the element is attached or associated. The security element might provide a link or pointer to other information associated with the element or the device to which the element is attached or of which the element forms a part.

Some optically readable security elements have been proposed which incorporate the use of one or more optically readable structures, optically readable in response to excitation of the optically readable structure. For instance, the optically readable structure might take the form of a quantum dot, or molecules of fluorescent material, or some other form of optical emitter. These structures would be readable in some way in order to derive information from the structures, and therefore the element as a whole, to provide the required security, for example the unique identifier, or embedded data, and so on.

Typically, such optically readable structures will have known excitation-emission relationships when the respective structure is read in isolation, for example in a laboratory or test environment. It is highly desirable for this excitation-emission relationship to be maintained when the structure is incorporated into an optically readable security element, such that reading consistency, and for example mapping of readings onto reference data, is consistent and reliable. Therefore, existing or proposed optical security elements are designed and made with this aim in mind. However, it is this very design and manufacture process which can actually introduce a possible security flaw in the optical security element. This is because the security provided may be more readily circumvented or overcome as the very result of this reliability and consistency. Or, from another perspective, the designers and manufacturers of existing optically readable security elements have not realised that deliberately avoiding this reliability and consistency between isolated, and in-situ (in or on an element), performance of optically readable structures can actually bring about benefits in the use of optically readable security elements.

It is an example aim of example embodiments of the present invention to at least partially avoid or overcome one or more disadvantages of the prior art, whether identified herein or elsewhere, or at least to provide a viable alternative to prior art methods and apparatus.

According to the present invention there is provided an apparatus and method as set forth in the appended claims. Other features of the invention will be apparent from the dependent claims, and the description which follows.

According to a first aspect of the invention, there is provided a method of deriving information from an optically readable security element, the method comprising: optically reading the optically readable security element, the optically readable security element comprising one or more optically readable structures, optically readable in response to excitation of the one or more optically readable structures, the one or more optically readable structures being arranged to interact with one or more proximal structures of the optically readable security element, the interaction being such that an excitation-emission relationship for the one or more optically readable structures interacting with the one or more proximal structures, is different to an excitation-emission relationship for the one or more optically readable structures and the one or more proximal structures in isolation; the reading comprising: determining data indicative of an optical property of the optically readable security element using first emission electromagnetic radiation, emitted in response to first excitation of the one or more optically readable structures; and deriving the information from the determined data.

The reading may comprise determining data indicative of an optical property of the optically readable security element using the first emission electromagnetic radiation, emitted in response to first excitation of the one or more optically readable structures, and using second emission electromagnetic radiation, emitted by the one or more proximal structures in response to the first excitation of the one or more optically readable structures.

The reading may comprise determining data indicative of an optical property of the optically readable security element using third emission electromagnetic radiation, emitted in response to second, different, excitation of the one or more proximal structures.

The one or more optically readable structures and the one or more proximal structures may comprise, respectively, higher and lower energy structures, for example higher and lower energy optically readable structures.

The optically readable structures, which may be the higher energy structures, may have a higher (larger) energy bandgap than the proximal structures, which may be the lower energy structures (which have a lower, smaller, energy bandgap).

The first excitation may be at or beyond a bandgap of the higher energy structures (e.g. optically readable structures).

The second excitation may be at or beyond a bandgap of the lower energy structures (e.g. optically readable structures), and below a bandgap of the higher energy structures (e.g. optically readable structures)

Excitation may be via excitation electromagnetic radiation

First and second, different, excitation may be via first and second, different, excitation electromagnetic radiation.

Different excitation may be via different excitation wavelengths (including energies or frequencies, such as colours), or intensities. Energy may refer to photon energy, such as wavelength or frequency, or overall energy, which may include wavelength or frequency or intensity.

The difference in excitation-emission relationship as a result of the interaction may be one or more of: a different wavelength of emission; and/or a different intensity of emission; and/or the one or more optically readable structures and/or the one or more proximal structures being caused to emit, or not emit.

The method may further comprise: before the reading, applying a strain field to the optically readable element, to change the interaction between the one or more optically readable structures and the one or more proximal structures, to change the excitation-emission response; or after the reading, applying a strain field to the optically readable element, to change the interaction between the one or more optically readable structures and the one or more proximal structures, to change the excitation-emission response, and undertaking a subsequent reading.

The derived information may relate to verifying that: the interaction comprises an energy transfer having taken place between the one or more optically readable structures and/or the one or more proximal structures; and/or the one or more optically readable structures and/or the one or more proximal structures is a quantum system and complex at the atomic scale; and/or that the optically readable security element is authentic.

The one or more optically readable structures may be arranged to interact with one or more proximal structures of the optically readable security element, due to the one or more optically readable structures and the one or more proximal structures of the optically readable security element being close enough for energy transfer to take place between the structures.

The deriving may comprise: comparing the determined data with expected data, optionally relating to an expected emission wavelength or intensity, The expected data may be from a previously determined reading of an at least related optically readable security element, or from a reading of the one or more optically readable structures in isolation.

The one or more optically readable structures comprises one or more continuous or discrete components exhibiting quantum mechanical confinement, the or each component being capable of emitting electromagnetic radiation linked to that quantum mechanical confinement, in response to the excitation, wherein the confinement of the one or more continuous or discrete components optionally confines in one or more of three (e.g. a quantum dot), two (e.g. a quantum wire) or one (e.g. a quantum well) spatial dimensions.

The one or more proximal structures may be one or more optically readable structures.

The one or more proximal structures may be one or more optically readable structures, comprising one or more continuous or discrete components exhibiting quantum mechanical confinement, the or each component being capable of emitting electromagnetic radiation linked to that quantum mechanical confinement, in response to the excitation, wherein the confinement of the one or more continuous or discrete components optionally confines in one or more of three (e.g. a quantum dot), two (e.g. a quantum wire) or one (e.g. a quantum well) spatial dimensions.

The one or more proximal structures may comprise one or more plasmonic nanostructures.

The method may additionally comprise using the reading to determine a unique identifier for the optically readable security element.

Determining a unique identifier may include establishing that identifier, or reading that identifier (e.g. for a check with an existing, e.g, reference, identifier).

Determining a unique identifier may include using one or more excitation-emission relationships, for one or more optically readable structures, in one or more locations of the security element; and/or using the derived information, for one or more optically readable structures, in one or more locations of the security element.

According to a second aspect of the invention, there is provided a system for deriving information from an optically readable security element, comprising: an optical reader, for optically reading the optically readable security element. The optically readable security element comprises one or more optically readable structures, optically readable in response to excitation of the one or more optically readable structures. The one or more optically readable structures are arranged to interact with one or more proximal structures of the optically readable security element. The interaction is such that an excitation-emission relationship for the one or more optically readable structures interacting with the one or more proximal structures is different to an excitation-emission relationship for the one or more optically readable structures and the one or more proximal structures in isolation. The optical reader is arranged to determine data indicative of an optical property of the optically readable security element using first emission electromagnetic radiation, emitted in response to first excitation of the one or more optically readable structures, and the system is arranged to derive the information from the determined data.

According to a third aspect of the invention, there is provided a optically readable security element from which information is derivable, comprising: one or more optically readable structures, optically readable in response to excitation of the one or more optically readable structures; the one or more optically readable structures being arranged to interact with one or more proximal structures of the optically readable security element, the interaction being such that an excitation-emission relationship for the one or more optically readable structures interacting with the one or more proximal structures, is different to an excitation-emission relationship for the one or more optically readable structures and the one or more proximal structures in isolation; the optically readable security element being readable to determine data indicative of an optical property of the optically readable security element using first emission electromagnetic radiation, emitted in response to excitation of one or more optically readable structures; in use, the deriving information comprising deriving the information from the determined data.

According to a fourth aspect of the invention, there is provided a method of deriving information from an electrically readable security element, the method comprising: electrically reading the electrically readable security element, the electrically readable security element comprising one or more electrically readable structures, electrically readable in response to excitation of the one or more electrically readable structures, the one or more electrically readable structures being arranged to interact with one or more proximal structures of the electrically readable security element, the interaction being such that an excitation-response relationship for the one or more electrically readable structures interacting with the one or more proximal structures, is different to an excitation-response relationship for the one or more electrically readable structures and the one or more proximal structures in isolation; the reading comprising determining data indicative of an electrical property of the electrically readable security element using a first electrical change, the electrical change being in response to first excitation of the one or more electrically readable structures; and deriving the information from the determined data.

According to a fifth aspect of the invention, there is provided a system for implementing the method of the fourth aspect.

Many of the features described above in relation to the optical reading aspect apply equally to the electrical reading aspect, in terms of different excitation energies (e.g. voltages), and responses (e.g. currents), and where emission radiation principles are replaced with electrical change or response principles. The interaction between the structures can be determined, identified, or otherwise used or derived from a change in electrical response to an excitation, which change would not be present if the structures were not interacting.

It will be appreciated that one or more features of one or more of the aspects or embodiments described herein may be used in combination with, or in place of, any one or more features of another aspect of embodiment of the invention as described herein, unless such combination or replacement would be understood by the skilled person to be mutually exclusive after reading of this disclosure. For instance, and in particular, any feature described in relation to a method-like aspect or embodiment may be used in combination with or in place of one or more features of an apparatus-like aspect or embodiments, and the other way around.

For a better understanding of the invention, and to show how embodiments of the same may be carried into effect, reference will now be made, by way of example, to the accompanying diagrammatic Figures in which:

FIG. 1 schematically depicts an optical reader, optically reading an optically readable security element, in accordance with an example embodiment;

FIG. 2 schematically depicts an optically readable security element in accordance with an example embodiment, and reading principles associated with that embodiment;

FIG. 3 schematically depicts different forms of excitation for the optically readable security element of FIG. 2;

Figure 6:
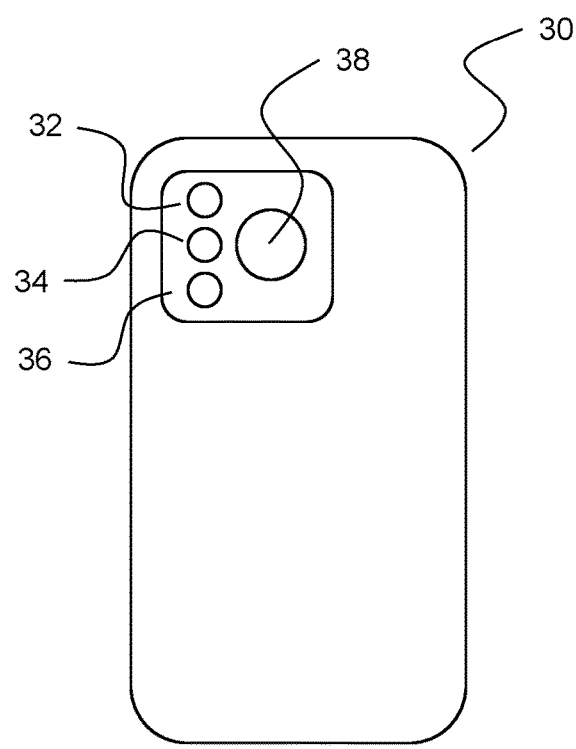
Figure 7:
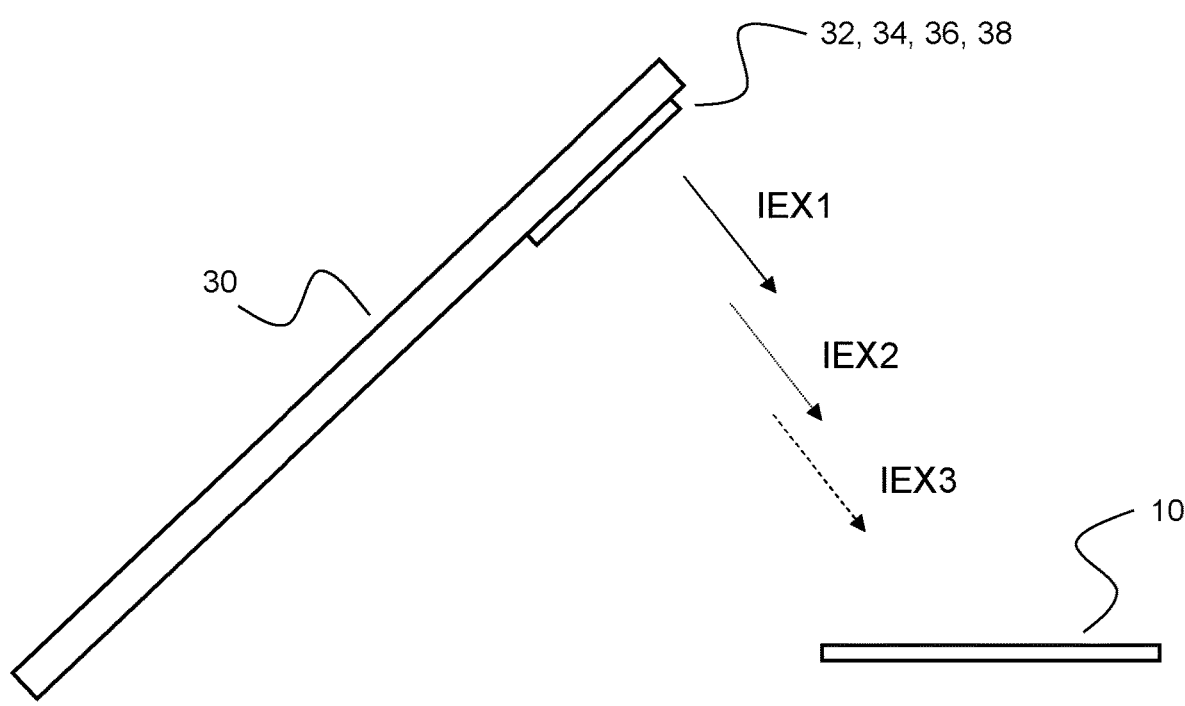
Figure 8:
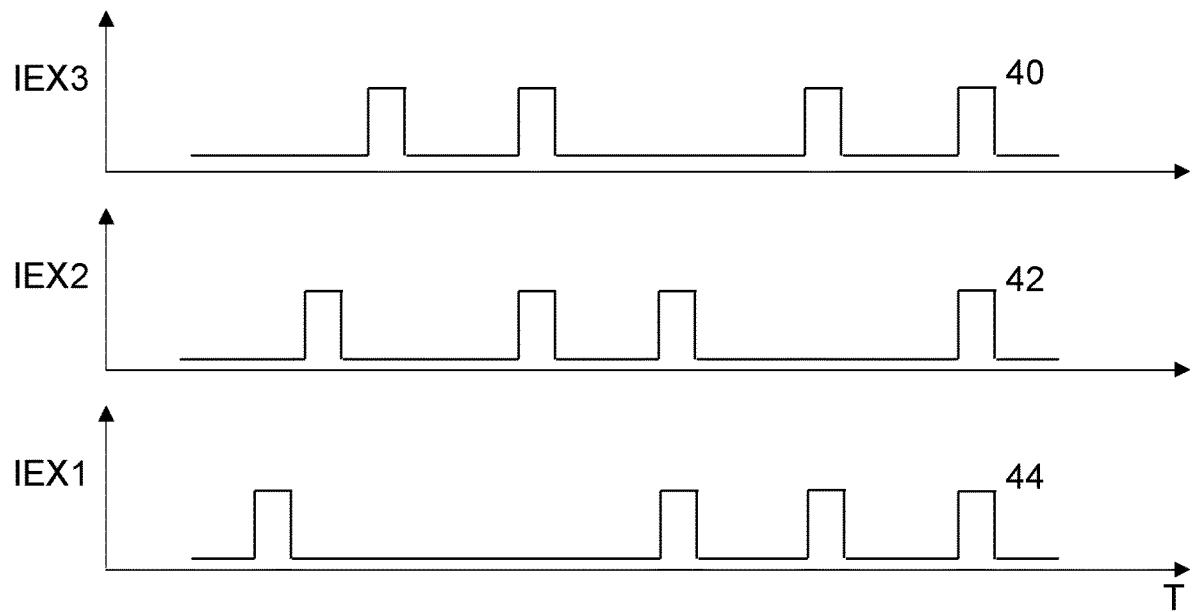
Figure 9:
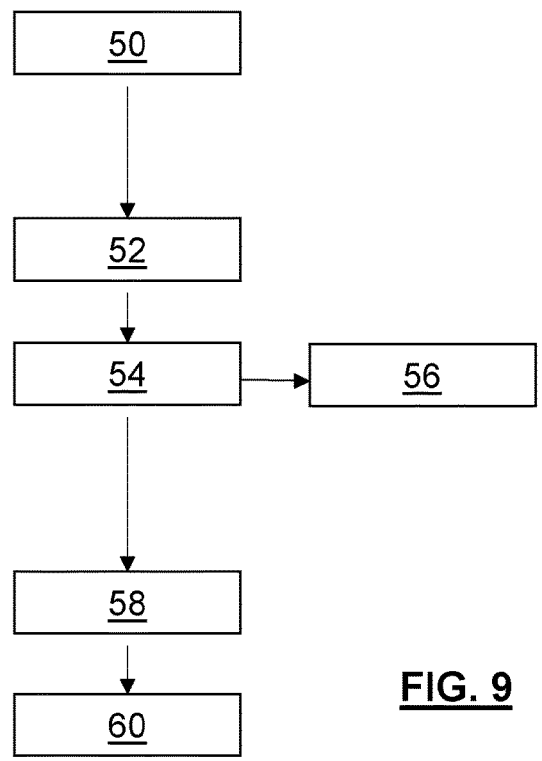
Figure 10:
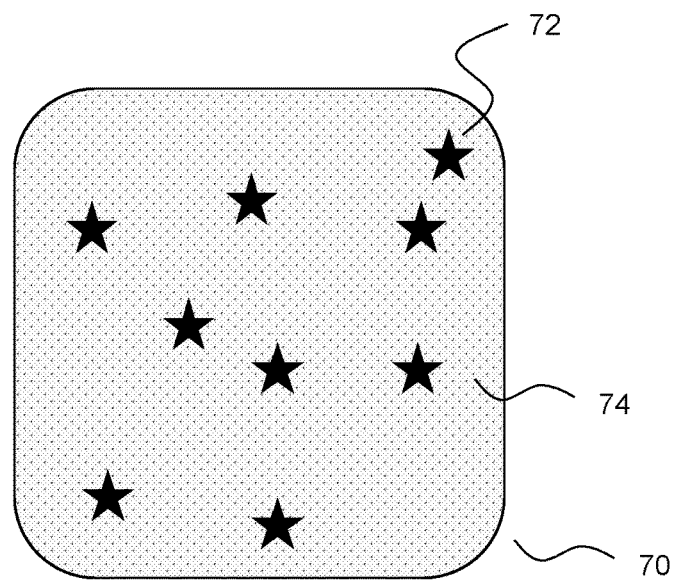
Figure 11:
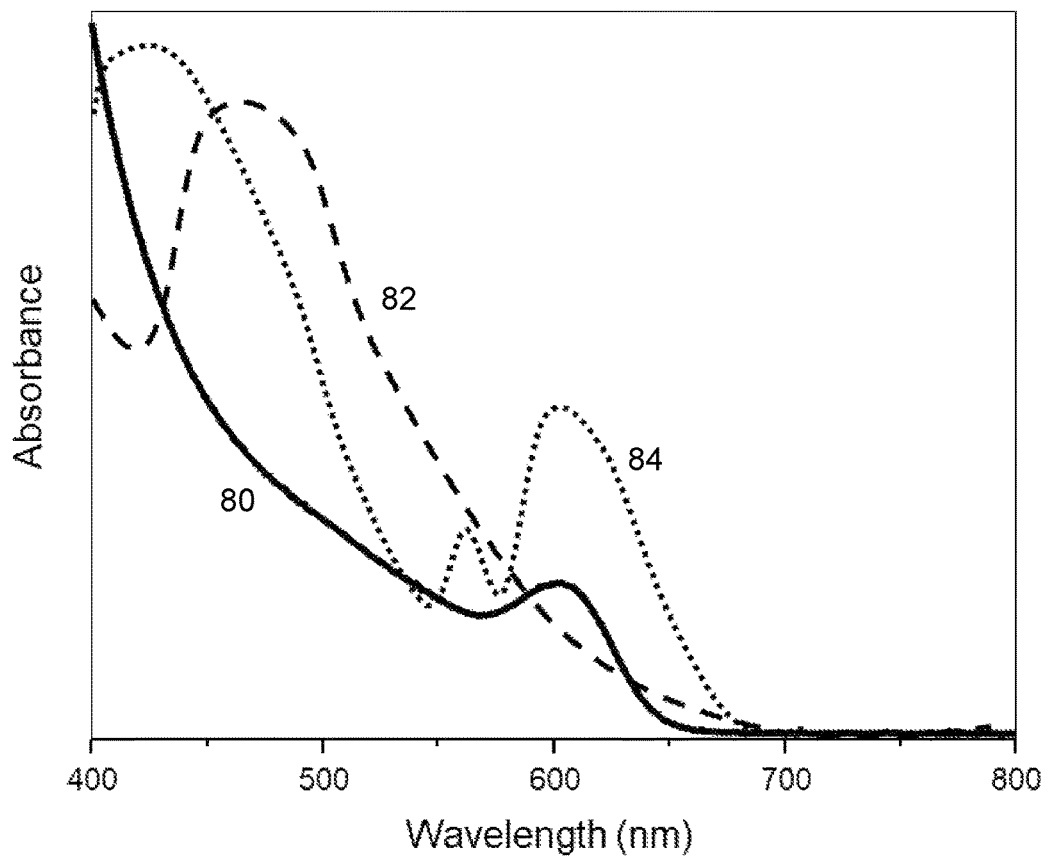
Figure 12:
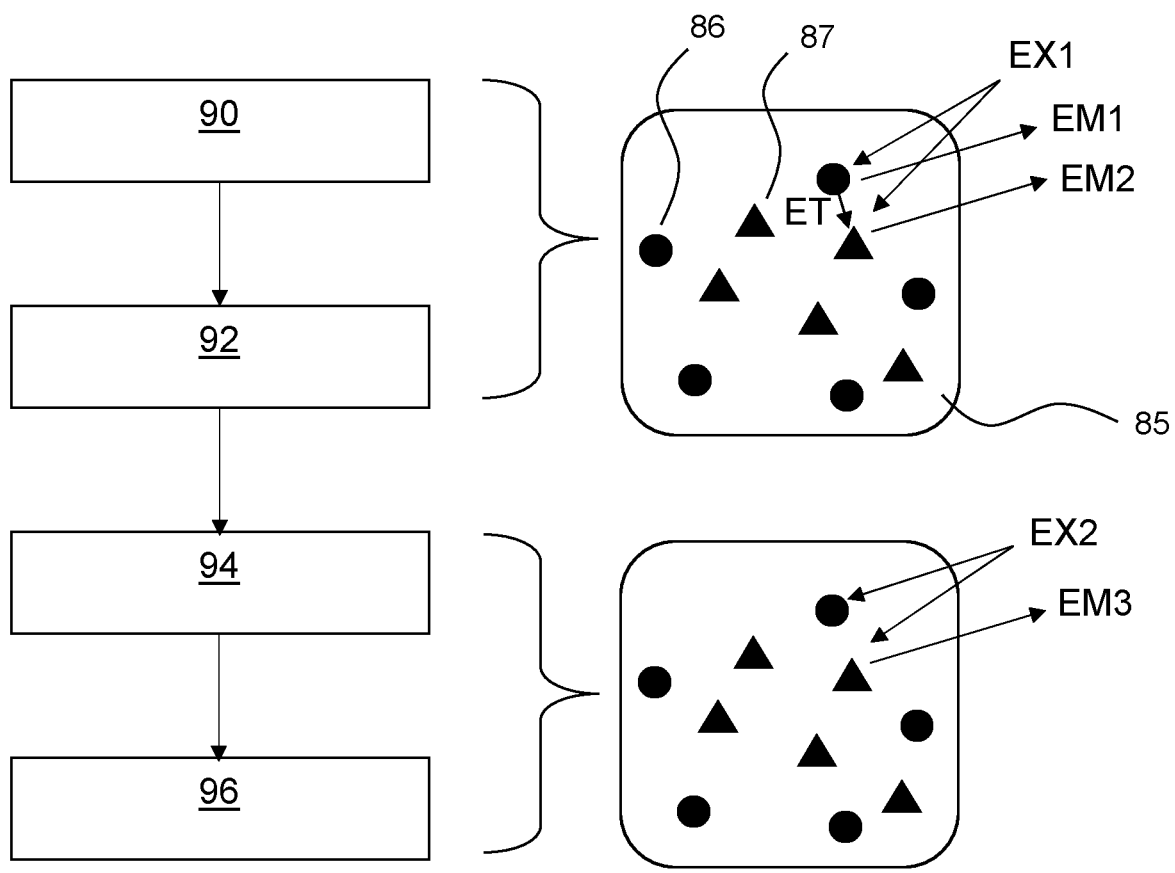
Figure 13:
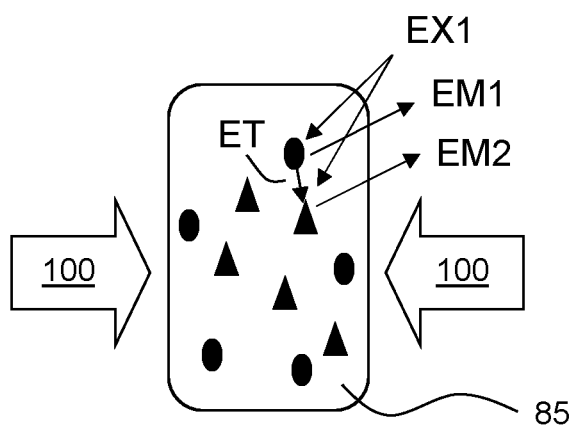
Figure 14:
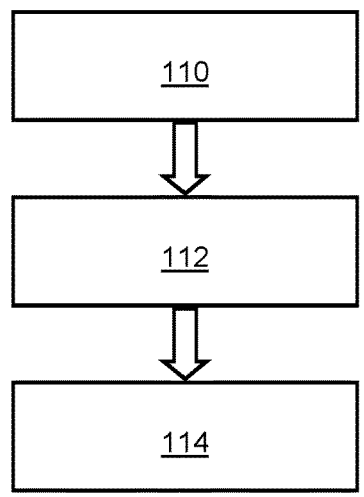
Figure 15:
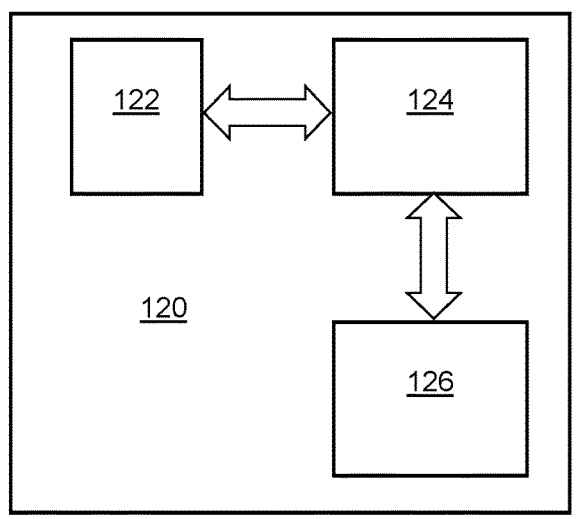
Figure 16:
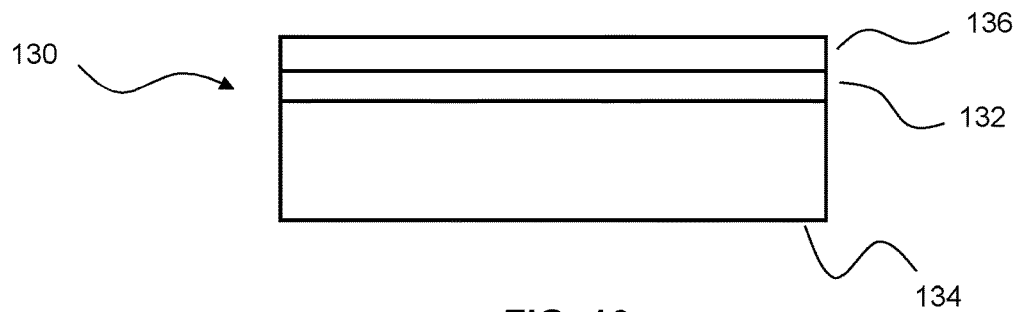

FIG. 6 schematically depicts an optical reader, in the form of a mobile telephone, in accordance with example embodiments;

FIG. 7 schematically depicts use of the optical reader of FIG. 6, in accordance with example embodiments;

FIG. 8 schematically depicts different excitation profiles for different electromagnetic radiation sources of the optical reader of FIGS. 6 and 7;

FIG. 9 schematically depicts a flow chart, showing example methodology for implementation on embodiments of the present invention;

FIG. 10 schematically depicts a different optically readable element, comprising a number of optically readable structures and different proximal structures arranged to interact with those optically readable structures, according to an example embodiment;

FIG. 11 is a graph schematically depicting physical principles associated with the interaction of the optically readable structures, and proximal structures, of the element of FIG. 10;

FIG. 12 schematically depicts methodology for identifying at least of one of quantum complexity of, or energy transfer between, optically readable structures of an optically readable security element, in accordance with an example embodiment;

FIG. 13 schematically depicts application of a strain field to the optically readable element of FIG. 12;

FIG. 14 schematically depicts general methodology associated with general principles of the present invention;

FIG. 15 schematically depicts general apparatus-like aspects associated with general principles of the present invention; and FIG. 16 schematically depicts general principles associated with an optically readable security element in accordance with general aspects of the present invention.

Figure 1:
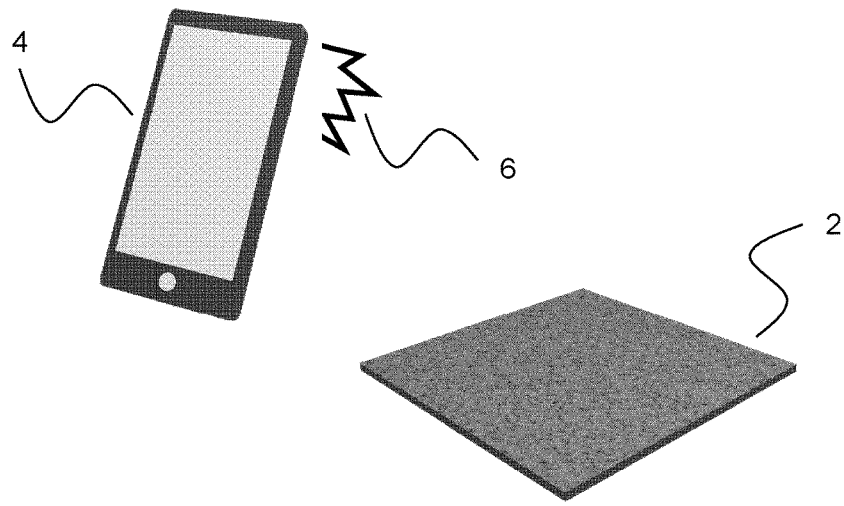

FIG. 1 schematically depicts an optically readable security element 2 comprising a number of optically readable structures, optically readable in response to excitation of the optically readable structures.

The optically readable structures (i.e. optical emitters) could take one of a number of different forms. However, one advantageous form is when the optical structure comprises one or more continuous or discrete components exhibiting quantum mechanical confinement, the or each component being capable of emitting electromagnetic radiation that is linked to that quantum mechanical confinement, in response to that excitation. The confinement of the one or more continuous or discrete components may be in one or more of three (e.g. a quantum dot), two (e.g. a quantum wire) or one (e.g. a quantum well) spatial dimensions. For instance, the optically readable structure might take the form of quantum dots, flakes of material, flakes of 2D material, nanowires, and so on. Such structures, exhibiting quantum mechanical confinement, are advantageous since their placement and distribution on an element, and unique interactions with components of the elements, mean that they can exhibit an easily readable, but very difficult to copy, configuration. For instance, the reading may be undertaken using relatively simple excitation and reading means, yet security provided may be particularly rich and complex, since it may be very difficult, if not impossible, to easily spoof or replicate the physical location and excitation-emission relationships of such structures. The excitation-emission performance might be particularly efficient, too, and also any emission might be particularly sharp or pronounced, making it easy to detect, or to differentiate from emission of other emitters of the element.

The excitation of such structures could be, for instance, via an electrical input, or an optical (e.g. electromagnetic radiation) input. Both can be satisfactory, but it is envisaged that optical excitation with excitation electromagnetic radiation would be a far more versatile and user-friendly approach, such that, for example, a mobile telephone or tablet could easily excite and read the security element.

Referring back to FIG. 1, an optical reader is shown in the form of a mobile telephone or tablet device 4. Reading of the optically readable security element 2 with the reader 4 is undertaken using a camera or other sensor provided in the reader 4. Excitation of optically readable structures of the optically readable security element 2 may be undertaken using electrical stimulation or excitation of the optically readable security element 2, or via optical excitation. Optical excitation may be preferable, and may be implemented using ambient light, or more likely via one or more controllable electromagnetic radiation sources of or associated with the reader 4, for example via a flash 6 or another light source of the reader 4.

Figure 2:
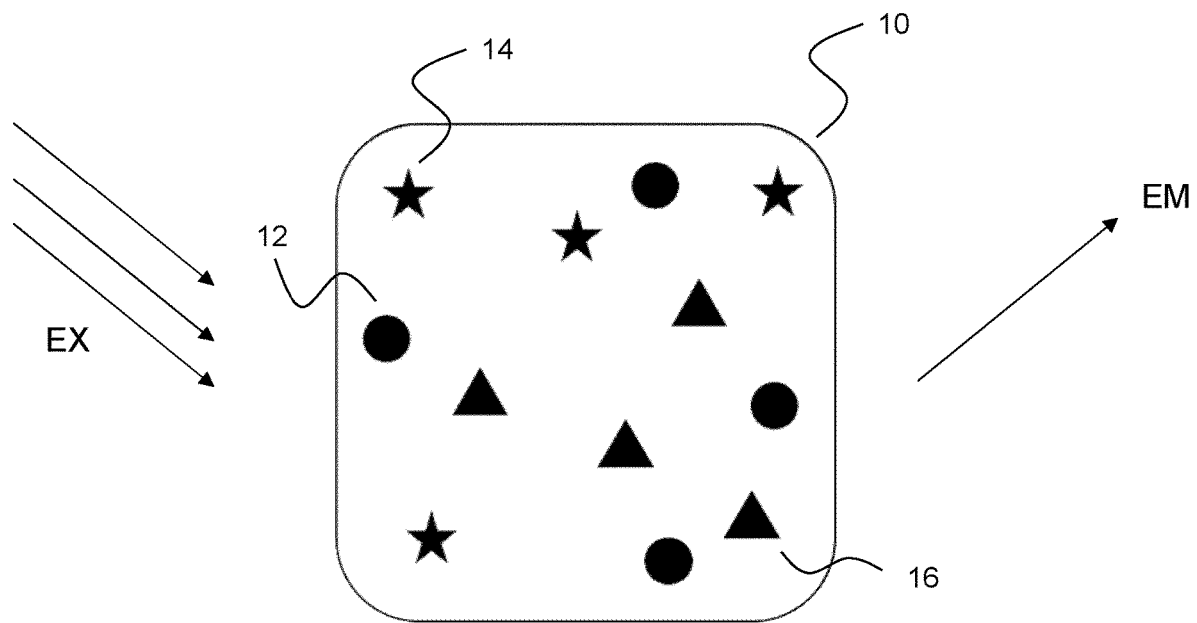

FIG. 2 shows a plan view of an optically readable security element 10 provided with a number of different optically readable structures 12, 14, 16 distributed randomly across the element 10. Also shown in simplistic form is excitation by electromagnetic radiation EX, used to excite the structures 12, 14, 16, and electromagnetic radiation emitted EM by those structures 12, 14, 16 in response to that excitation EX.

It will be appreciated that various different implementations of optically readable security elements may be realised, using one or more different types of optically readable structures, for example distributed across the elements in an ordered or random manner. Reading of the structures, for example the excitation-emission relationship of one or more optically readable structures, typically in more than one location, can be used in association with a degree of security that the element provides, as discussed above. For instance, the relationship (or more generally information derivable from the element) might be used to determine a unique identifier, which includes confirming or authenticating such identifier, and/or might in some way provide some embedded data associated with the element or an object to which the element is attached, and so on. The use or confirmation of a unique identifier is only one type of information that could be derived from the element. For instance, in other examples, as will be discussed below, it may be possible to determine whether or not the optically readable security element comprises optically readable structures which are or define a complex quantum system, or exhibit a related energy transfer effect at an atomic-like level. This determination might be a relatively quick and easy way of checking that the optically readable security element comprises optically readable structures providing such a complex quantum system, as opposed to a simple spoof, photocopy, or crude replication of such an element. In other words, a simple test or challenge can be used to reveal the presence or absence of complex quantum (e.g. authentic) underpinning behaviour, or the absence of such behaviour (non authentic).

Figure 3:
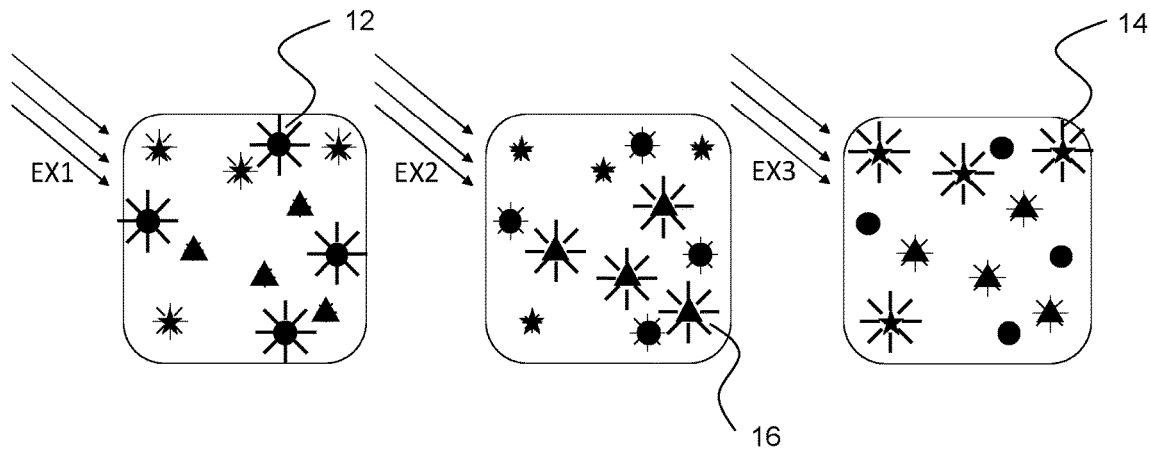

FIG. 3 shows the optically readable security element of FIG. 2, but in three different scenarios: when exposed to first excitation radiation EX1; second excitation radiation EX2; and third excitation radiation EX3. The excitation radiation EX1, EX2, EX3, is deliberately chosen (e.g. has an energy) to specifically or predominantly excite each of the particular optically readable structures 12, 16, 14.

The excitation could be undertaken in sequence, or in parallel, with one or more different sources, or could even be undertaken at the same time with a single source (e.g. a source comprising more than one energy or wavelength of electromagnetic radiation).

Figure 4:
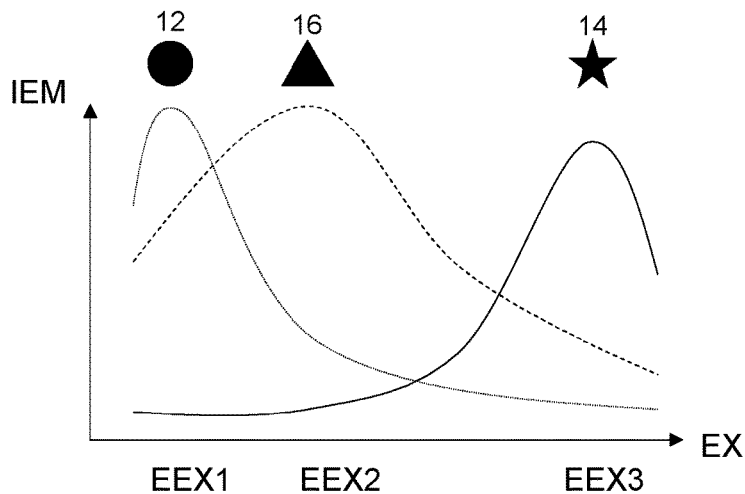
FIG. 4 is a graph schematically depicting excitation-emission relationships for the read optically readable structures of the security element excited in the manner shown in relation to FIG. 3.

FIG. 4 is a graph schematically depicting energy of excitation versus intensity of emission responses or relationships for the different structures 12, 14, 16. It can be seen that, as discussed above, there are certain peaks in the responses of the respective structures 12, 14, 16 for particularly chosen excitation energies (e.g. wavelengths or frequencies) EEX1, EEX2, EEX3, corresponding to the three different excitations EX1, EX2, EX3 of FIG. 3.

As discussed above, within the field of optically readable security elements, it has typically been desirable and an aim to ensure that excitation-emission relationships of structures in isolation were replicated and maintained when those same structures were used in the context of (e.g. within and forming part of) an optically readable security element. However, the inventors of the present application have realised that while this is desirable, and might indeed work in many instances, there are disadvantages associated with this aim and these implementations. The inventors have realised that there are numerous and significant benefits in taking essentially the opposite approach.

According to the present invention, it has been realised that a more advantageous approach is to actually ensure that the one or more optically readable structures are arranged to interact with one or more proximal structures of the optically readable security element. The interaction is such that an excitation-emission relationship for the one or more optically readable structures interacting with the one or more proximal structures is actually (and deliberately) different to an excitation emission response for the optical or proximal structures in isolation.

Put simply, it has been realised that allowing or forcing such interaction allows information to be derived from the optically readable security element that would not otherwise be derivable, thereby increasing the functionality and general use of the optically readable security element. For instance, the very presence of the interaction may be extremely difficult, if not impossible, to replicate in any attempt to spoof or counterfeit the element or security it provides. The very presence of such an interaction can hint at or reveal or verify an energy transfer having taken place between the one or more optically readable structures and/or the one or more proximal structures (impossible with a simple photocopy or crude counterfeit element), and/or that the structures define a quantum system which is complex at the atomic scale (again, impossible to replicate with a photocopy or crude counterfeit). The extra information could therefore be, or be used in forming, a richer or stronger identifier, or be extra data in terms of identifying and using (in a qualitative or quantitative way) the interaction in some way.

Typically, the one or more optically readable structures are arranged to interact with the one or more proximal structures of the optically readable element, due to the one or more optically readable structures and the one or more proximal structures of the optically readable security element being close enough for energy transfer to take place between the structures. That is, the distance between the structures is such that the interaction is able to take place. This distance will of course vary, depending on the structures used, and the application in question. However, alternatives are possible, for example there being some form of conductive or chemical matrix or links between the structures which might allow, or better allow or control, this interaction to take place. However, implementation via distance control is likely to be easier to implement. Coatings or spacers might be employed on or between the structures, to promote, maintain or establish desired spacings or spacing thresholds.

In practice, it may be desirable to ensure that the optically readable structures are prevented from clumping, to control or limit their interactions and make the variations in interactions easier to measure. This can be achieved by adding a coating, or multiple coatings, to the structures (e.g. dots or flakes). This can be an inorganic shell, or by attaching organic ligands. These coatings stop the structures from getting too close to each other, but can also make them soluble in a carrier liquid that is used for deposition, preventing clumping. Variations in the strength of interaction occur naturally with the random deposition of the structures, but the amount or degree can be engineered through the choice of coating and the density of the material used.

Figure 5:
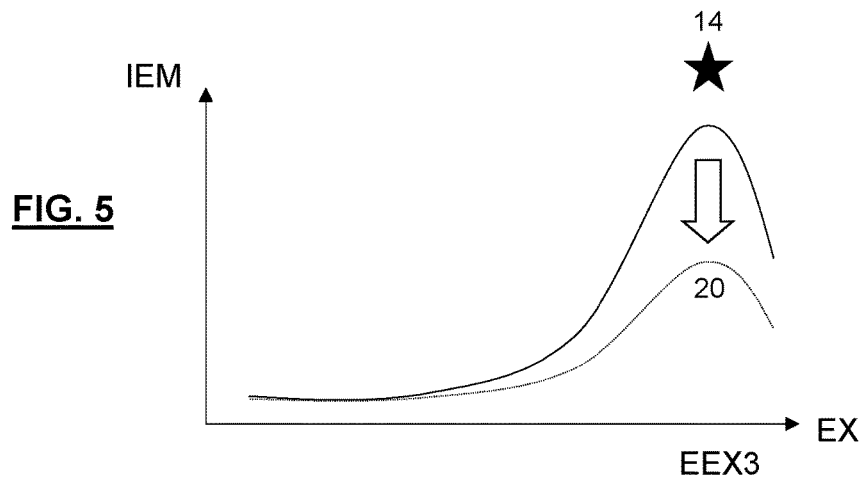
FIG. 5 is a graph schematically depicting a difference in an excitation-emission response for an optically readable structure when excited and read in isolation, and when excited and read in-situ in the optically readable element according to example embodiments.

FIG. 5 is a graph showing the excitation-emission response for the structure 14 already shown in and described with reference to FIGS. 2 to 4. However, and as already discussed above, the excitation-emission relationship for each of the different structures shown in FIGS. 2 and 3, and demonstrated in FIG. 4, are all read in-situ, where these structures 12, 14, 16 are close enough (in this embodiment) to interact with one another as discussed above. FIG. 5 shows that, if the structure 14 were to be read in isolation of any other structures, the isolated excitation-emission relationship 20 would be different. In this case, the difference is that the intensity of emission IEM would be lower for a given (e.g. normalised) excitation wavelength or similar. In this crude example then, the interaction between structures has resulted in the excitation intensity being increased when this particular structure 14 is excited with particular excitation energy (e.g. wavelength) EEX3.

In the example shown in FIG. 5, then, this shift in emission intensity as a result of the interaction with proximal structures (in this case other optically readable structures) can be utilised. For instance, baseline or reference readings for the element and its structures may be undertaken as part of a manufacturing or calibration phase, prior to the elements being released for general use. When the element is subsequently read by a user, determined, read data can be compared with expected data (e.g. the reference data), for example relating to an expected emission intensity as discussed above or perhaps even an expected emission wavelength. If the comparison is found to reveal an unexpected deviation, information is revealed, ranging from the read elements showing signs of being not authentic, or tampered with, or modified in some way.

The reading and deriving of information could be quantitative in nature, for example yielding a degree of change from the expected data, or could simply be qualitative in nature, simply revealing or flagging an unexpected deviation from an expected or baseline reference measurement.

The comparison could be undertaken with baseline measurements or calibration measurements of that same element, earlier in time, or a related element. The element might be related in that it is formed from the same batch, or in much the same way, or is designed and manufactured to have much the same interaction between structures forming the optically readable element. Alternatively, the comparison might not be undertaken with regard to a baseline or reference measurement of the optically readable structures in-situ in an optically readable element. Instead, comparison could be made with the optical property data that would be expected in an excitation-emission test on such structures in isolation. For instance, if the optically readable security element is designed and manufactured to deliberately have this in-built interaction, the presence or absence of the indication on this interaction can, of course, quickly reveal whether the optically readable security element has this in-built interaction. For example, proximity between structures is important for promoting and/or revealing the interaction, and so changes in applications of strain fields to the optically readable element can impact this interaction. Changes in strain field before any reading can perhaps be inferred from the reading, when compared against previous readings, or a strain field can be applied to the element in order to impact the interaction and therefore reveal the interaction.

In many instances, the subtle and powerful advantages associated with using the interaction in any reading of the element can be implemented with only a single type of excitation, for example a single electromagnetic radiation source, or excitation radiation having only a single frequency or wavelength. In other examples, however, the use of multiple different types of excitation can be used to derive more information from the element, or different information from the element, or to reveal this information in a different way, all of which can be used to improve the security that the element provides.

FIG. 6 shows an optical reader according to an example embodiment. In this example, the optical reader takes the form of a mobile telephone 30. The mobile telephone 30 comprises a number of electromagnetic radiation sources 32, 34, 36, each typically capable of emitting radiation with a different central or peak wavelength or colour (e.g. different colour LEDs). Indeed, the excitation and/or emission may be invisible to the user, and may be UV or infrared in nature, for example. A sensor is shown in the form of a camera 38. Typically, the camera 38 will comprise a 2D sensor, capable of reading emission from the optically read security element at a plurality of locations, typically at the same time.

In general, any reading undertaken in accordance with the invention may be undertaken for multiple locations across the optically readable security element, in sequence or in parallel. This may be useful for obtaining readings at different locations, or even building, or cross-checking against, a map of the structures or their excitation-emission relationships. This may be useful in determining a fingerprint or identifier for the element.

FIG. 7 shows the mobile telephone 30 of FIG. 7 emitting electromagnetic excitation radiation IEX1, IEX2, IEX3, towards the optically readable security element 10 and its optically readable structures. The excitation radiation IEX1, IEX2, IEX3, may be emitted in simultaneous combinations, for example in parallel or at the same time, or in sequence.

Following on from FIG. 7, FIG. 8 shows examples of electromagnetic radiation source (e.g. LED) pulse sequences 40, 42, 44 for each of the respective sources of the mobile telephone. As is shown in the Figure, it can be seen that the different electromagnetic radiation sources may be controlled to emit radiation, and excite optically readable structures, in different sequences, different combinations, or even in parallel. This approach might be used to provide a particular optically readable structure with a particular excitation energy or wavelength or colour, or to provide a structure with multiple excitation energies or wavelengths or colours, or multiple different optically readable structures with different excitation energies, with the same or different colours.

It will be appreciated that the embodiments shown so far, and related applications, have been described in relation to optical excitation and optical reading of optically readable structures of an optically readable security element. However, many of the same principles can be applied when electrically exciting, or even electrically reading, an electrically readable or excitable security element. For instance, instead of illuminating the optically readable security element with electromagnetic radiation, an electrical-based security element could be challenged by providing an electrical input to the one or more structures, for example via one or more electrical contacts or terminals of the element. Voltage or current input may be varied, for example, to excite the one or more (electrically) readable structures of the element. In one example, the structures might be excitable to emit radiation, as discussed above in the optical embodiments. In another example, the electrical input or stimulation might be used to electrically excite the electrically readable structures, so that an electrical response to the excitation is obtained. The response might be a variation in voltage or current across the element as a whole, or across particular areas or regions of the element where the excited structures are located. For instance, a response might be a chance in electrical resistance. However, while it is clearly possible for electrical excitation and/or reading to take place, it is generally envisaged that optical excitation and/or reading would be a far more convenient way of implementing concepts described herein, particularly for an end-user in an everyday environment.

Referring back to the figures, FIG. 9 schematically depicts example methodology for implementing various aspects of the present invention.

In a first step 50, quantum material, consisting of two or more different types of optically readable structures (emitters), each having a different peak emission energy, and each with a different emission intensity as a function of incident energy, is or are excited by an external configurable source.

This source may be electrical or optical in nature, as described above. The excitation energy of the configurable source is selected from, for instance: a set based on classically encoded information accompanying a quantum material; selected randomly from a set of available energies; or using a pre-set starting energy. The choice may very well depend on the application in hand, and the nature of security that is to be provided or checked. The excitation may contain a single peak energy, or be a combination of multiple energies.

In a next step 52, each set of emitters is excited and responds with an energy and intensity which is a function of the incident excitation energy and its intensity, with each set of emitters responding with a different relative intensity for a given incident energy.

In a next step 54, the emitted energy and its intensity is measured by a capture device (e.g. an optical reader), which builds a map of intensities corresponding to the emitted energies. The map may be used (directly or indirectly) to index into a known set of maps established at an initial testing or calibration phase, for example on a server, or locally on a user's device. This allows authentication or similar to be undertaken, based on the read emission energies and intensities versus the related excitation.

At this stage, it is worth noting that the mapping authentication might well relate to the excitation-emission relationships, which will reveal or confirm the interaction between the proximal structures. However, in addition or in parallel to this, a general distribution of optically readable structures on the optically readable element (or similar) may be used as an identifier or fingerprint for the device, which may be used to provide a secondary degree of authentication, or even to identify the optically readable element against a base or reference element or related data, against which comparisons in the excitation-emission relationships, and the associated interaction between proximal structures, can be assessed. Alternatively, the reader may read a separate code visible or otherwise present in or adjacent to the element to allow for such comparisons.

If the map (or, in general, read data versus predetermined data) is authenticated within the set error bounds, then the server (or general service provider) responds with the energy and intensity of excitation that should be used to excite the device further, if required, or that no further excitation is required to demonstrate authenticity. For instance, a single set of input-output measurements might be sufficient, or multiple rounds of measurements might be required or beneficial.

In a related step 56, if the map or related data cannot be authenticated within set error bounds, the service provider responds with a failure to authenticate. In the failure case, the system may re-try in terms of authentication, and/or alert the user. This particular part of methodology can be implemented in one of a number of different ways, as with the case for various steps described herein. For instance, the nature of the authentication, and the action taken in response, might be somewhat binary in nature, or fit within a spectrum. For instance, if some kind of issue is noted in the authentication process, it may simply not be possible for the user to in any way authenticate the device, and the user may be alerted to this in a relatively simple manner. In a perhaps more advanced setting, a more quantitative feedback might be provided, for example alerting the user, or even the service provider, to the extent to which the authentication has succeeded or failed, for example passing the test on one of more (but not all) of a number of attempts, or in different ways. For example, it may be noted that the authentication passes the identifier or fingerprint stage of testing, in terms of a general layout or distribution of optical emitters of the element, but then does not pass the test for determining whether an excitation-emission relationship is indicative of the interaction of proximal structures. This may be useful to the user, in terms of understanding where authentication has failed, particularly for an advanced user of the system, or may be particularly useful for the service provider, in terms of knowing why authentication has failed, or perhaps learning more about the failure in terms of understanding a possible spoofing or counterfeit approach or pattern.

In a next step 58, the quantum material is excited by a selected energy, or combination of energies, at the selected intensity, and each set of emitters respond with an energy and intensity which is a function of the incident excitation energy at its intensity, with each set responding with a different relative intensity for a given incident energy.

In a final step 60, the emitted energy and intensity is measured by the capture device, which is used to build a further map of energy and intensity. The map is used (directly or indirectly) to index into or with the known of maps. The service provider responds with a further energy and intensive excitation if further authentication is required, or the service provider reports that the quantum material responded as expected if the map is authenticated within set error bounds, or the service response with a failure to authenticate.

Steps 58 and 60 might be optional, in a simple implementation of the invention. Steps 58 and 60 might be steps undertaken for repetition purposes, for example for a failsafe, or might be undertaken at different excitation energies, for example to identify, or better identify any interaction between proximal structures. This latter point is elaborated on below, in FIGS. 10-12, and particularly in FIG. 12.

As discussed above, identifying, or checking for, or simply using changes in excitation-emission responses that are at least indicative of an interaction of optical emitter with proximal structures of the security element is important in providing a richer or more secure optically readable security element. As alluded to above, the optically readable structures and the proximal structures might be arranged such that the proximal structures are also optically readable structures. Alternatively or additionally, the one or more proximal structures might comprise structures that are not emitters, but nevertheless impact the excitation-emission of the optically readable structures. Different examples of these principles will now be described in more detail.

FIG. 10 schematically depicts an optically readable security element 70 in accordance with example embodiments. The optically readable security element 70 is provided with a number of optically readable structures in the form of quantum materials, such as quantum dots or flakes of material 72, as described above. However, in addition to these optically readable structures 72, the optically readable security element is also provided with a uniform or random distribution of plasmonic nanostructures 74. These plasmonic nanostructures form the proximal structures discussed above, in that the plasmonic nanostructures 74 are proximal to the optically readable structure 72, to the extent that they, together, interact and have an impact on the related optical excitation-emission relationship.

The plasmonic nanostructure 74 may be provided as part of the optically readable security element either before, during, or after deposition or otherwise application of the optically readable structure 72.

FIG. 11 is a graph showing absorbance data for the optically readable structures 80 and plasmonic nanostructures 82, if/or when those optically readable structures or plasmonic nanostructures were stimulated or excited in some way in isolation of one another. Importantly, the Figure also shows absorbance data for the structures 84 in proximal combination, where interaction as described above takes place.

It can be seen that by providing the structures such that they interact with one another, the absorbance data exhibits a plasmonic resonance in absorbance, in this case around 600 nm. This means that this particular mixture would shine particularly brightly if excited at or near this wavelength (600 nm). The data shown in FIG. 11 is interesting, in that this data clearly shows that not only does an interaction take place, but it is clearly detectable. For instance, and referring to the principles described above, if an authentication or other assessment was made of an optically readable security element shown in FIG. 10, if the plasmonic resonance did not appear in the excitation-emission relationship, then it would clearly be possible to quickly and easily determine that there were no plasmonic nanostructures present in the optically readable security element, or that the interaction established at some sort of test or calibration phase was no longer detectable. For the first result, this may show that the optically readable security element is counterfeit, or at least is clearly not as intended for use by the user. In the second example, this might show that tampering has taken place, where for example bending, or strain, or removal and reapplication of an optically readable security element has caused a strain field to be changed, which has meant that the plasmonic nanostructures are no longer able to interact, or interact as well, with the optically readable structures, meaning that the plasmonic resonance is not apparent, or not as apparent, as in the reference or test data.

The data is also interesting, in that it shows that the excitation-emission relationships of optically readable structures be tuned in some way, for example to a particularly convenient wavelength. For example, tuning could be to a non-visible wavelength, which might be useful for convenient user experience or implementation—the user may not actually know how or why the element has been authenticated, and the authentication may take place in the background or at least to some extent.

FIG. 12 shows related methodology, but where the proximal structures are optically readable structures, for example as in the examples described or alluded to above in relation to earlier Figures. However, in this particular example, the methodology does not necessarily look for, or just look for, particular excitation-emission relationships as previously mapped or established. In this approach of FIG. 12, it is actually possible to be able to quickly and easily probe the optically readable security element to determine if complex interactions are occurring at the atomic scale, which signify the presence of the interaction between proximal structures and as described above.

FIG. 12 shows an optically readable security element 85 comprising a first type of optically readable structure 86 and a second different type of optically readable structure 87. The structures 86, 87 are provided in or on the optically readable security element such that at least some of the structures are proximal enough to interact with one another as described above, having an impact on the related excitation-emission relationship, such that the relationship is different to those of the structures 86, 87 if or when challenged in isolation of one another. While this interaction might sometimes impact the degree or extent to which an excitation-emission relationship is impacted, for example a shift in intensity, or a shift in wavelength, this interaction also includes the possibility one or more of the structures being caused to emit or not emit, as a result of the interaction.

FIG. 12 shows that in a first step 90, the element 85 is illuminated with an energy EX1 larger than a bandgap of the first optically readable structures 86. The first optically readable structures 86 are, in this example, small quantum dots which means that they have a higher bandgap (they are higher energy structures). The second optically readable structures 87 are larger quantum dots, which means that they are low energy, having a smaller energy bandgap (they are higher energy structures).

In a second step 92, the incident energy EX1 causes the small quantum dots 86 to emit electromagnetic radiation EM1 and, as the small and large quantum dots (i.e. optically readable structures) 86, 87 are in close enough proximity, to transfer energy ET to the large quantum dots 87.

ET is extremely sensitive to the distance between the structures 86, 87. This means that if the distance changes then this interaction also changes, to the extent that the transfer energy is increased or reduced, or is possible or not possible. This means that strain applied to the optically readable security element can have a measurable impact on this relationship, as discussed further below.

The transfer energy ET and the incident energy EX1 cause the large quantum dots 87 to emit with energy EM2. Emissions EM1 and EM2 are measured by a measuring or capture device, for example the optical reader described above.

Depending on the implementation of the invention, the methodology described in steps 90 and 92 may already be sufficient to identify or otherwise use the interaction to derive information from the optically readable security element, for example the element being authentic, or matching predetermined reference data, and so on. This is because the emitted energy EM1 and/or EM2 might be quite different to an energy emitted by at least the first optically readable structure 86 if that structure was challenged (excited and read) in isolation. Or, the emitted energy EM2 might be unexpected or not possible without such interaction. However, further steps might be useful, in confirming the interaction, or ruling out other possibilities.

In the next step of the method 94, the optically readable security element is illuminated with an energy EX2, which is smaller (lower) than that of the bandgap of the small quantum dots 86, while at the same time being at or higher than the bandgap of the larger (low energy) quantum dots 87. This means that this excitation should not be able to excite the small (high energy) quantum dots 86.

In the next step, 96, the step 94 has led to an emission EM3 from the large (low energy) quantum dots 87, which is measured by the same measuring device. Due to the nature of the illumination, there is no emission from the small quantum dots 86, because they have not been excited.

Emission EM3 is not equal to emission EM2, described previously, due to the transfer effect being present in the case of emission EM2 and not with the emission EM3. This can therefore be viewed as a signature or confirmation of the transfer energy effect (sometimes referred as Förster resonance energy transfer, fluorescence resonance energy transfer (FRET), resonance energy transfer (RET) or electronic energy transfer (EET)) having taken place, or if the measurement reveals no results, not taken place. This measuring principle or methodology therefore can be used to verify (or otherwise) that the optically readable security element comprises optically readable structures that are quantum in nature, and interacting as described above.

As alluded to above, the energy transfer effect is extremely sensitive to the distance between proximal structures. This means that if the distance is changed, the energy transfer also changes, being greater or lesser in extent, or being possible or not possible. FIG. 13 shows that a distance between structures can readily be changed by applying a strain 100 to the optically readable security element 85, for example to deliberately or unintentionally change the distance between proximal structures. It will be appreciated that this can be taken advantage of in one of a number of different ways.

In one example, when any reference or baseline measurements were undertaken for the optically readable security element, there may have been an in-built strain field or no strain field present. Therefore, this might be a variable for when a subsequent measurement is undertaken, for example by an end-user. For instance, if the strain field is not the same as when the baseline or reference measurements were made, then the distance sensitivity for the energy transfer will mean that the measurements undertaken by the end-user will reveal data that does not correspond to the baseline or reference measurements. This might simply flag to the user that something is wrong, or an authentication step might fail. For instance, a change in strain might reveal exposure to certain environmental conditions, or for example removal of an optically readable security element from an object, and reapplication to another object, in an attempt to fake or spoof authentication for that object.

In another example, before any reading takes place, a strain field could be applied to the optical readable security element, for example by flexing or bending the element. If a change in the initial energies is noted, for example using the same sort of methodology described in FIG. 12, then this simple test might show that there is indeed complex quantum behaviour undertaken between the optically readable structures, and therefore prove that the optically readable security element comprises a complex quantum system. There may be no need for any quantitative, or further quantitative analysis, and this simple test might be sufficient to authenticate the element as being complex in nature, as opposed to a simple photocopy or some other form of counterfeiting.

Similarly, after an initial reading is undertaken, as discussed above, the optically readable security element could be bent or flexed to see if there is a further change in read data, which again is indicative of the interaction taking place due to the impact of strain on the distance between proximal structures.

The Figures described so far have generally described particular applications of apparatus or methods relating to the present invention. FIGS. 14 to 16 show more general principles.

FIG. 14 schematically depicts general methodology associated with embodiments of the present invention. A method of deriving information from an optically readable security element is shown. The method comprises optically reading the optically readable security element 110.

The optically readable security element comprises one or more optically readable structures, optically readable in response to excitation of the one or more optically readable structures, the one or more optically readable structures being arranged to interact with one or more proximal structures of the optically readable security element, the interaction being such than an excitation-emission relationship for the one or more optically readable structures interacting with the one or more proximal structures is different to an excitation-emission relationship for the one or more optically readable structures and the one or more proximal structures in isolation.

The reading comprises determining data indicative of an optical property of the optically readable security element using first emission electromagnetic radiation, emitted in response to the first excitation of the one or more optical readable structures 112.

The method further comprises deriving information from the determined data 114.

The information might take one of a number of different forms, and be qualitative or quantitative in nature, for example determining the nature of authentication, a unique fingerprint, a deviation from an expected reading, a pass/fail in any sort of authentication test or similar, and so on. Important, however, is that the information will of course relate to or be derivable from the interaction between the proximal structures.

FIG. 15 schematically depicts related, general, apparatus-like principles associated with the present invention. In this example, the apparatus comprises a system 120 for deriving information from an optically readable security element 122.

The system 120 comprises an optical reader for undertaking the reading 124. The reading is for optically reading the optically readable security element 122.

The optically readable security element 122 comprises one or more optically readable structures, optically readable in response to excitation of the one or more optically readable structures, the one or more optically readable structures being arranged to interact with one or more proximal structures of the optically readable security element, the interaction being such that an excitation-emission relationship for the one or more optically readable structures interacting with the one or more proximal structures is different to an excitation-emission relationship for the one or more optically readable structures and the one or more proximal structures in isolation.

The optical reader 124 is arranged to determine data indicative of an optical property of the optically readable security element using first emission electromagnetic radiation, emitted in response to first excitation of the one or more optically readable structures. The reader 124 might be the source of the excitation, or a separate or ambient source may be used.

The system 120 as a whole is arranged to derive the information from the determined data. In some examples, the reader might undertake this derivation of information, or a separate component might perform this functionality.

It will be appreciated that the system of FIG. 15 is shown as somewhat localised in nature. However, it will be appreciated that the system could be distributed in a far more delocalised manner, for example with the reader and element being located proximate to one another in use, but any components of the system storing reference data or similar could be located in a remote location, for example a remote server or similar. For instance, the system 120 might comprise or in some way be connected or able to communicate with a data store 126 which might store reference data or measurements against which readings are to be compared. The data store 126 could be for example a remote server (e.g. in or forming a conventional database in the cloud, or in a distributed ledger), or could in some embodiments be part of the reader 124.

FIG. 16 schematically depicts general principles associated with an optically readable element of the present invention 130. The optically readable security element 130 comprises one or more optically readable structures 132, optically readable in response to excitation of the one or more optically readable structures. The one or more optically readable structures 132 are arranged to interact with one or more proximal structures of the optically readable security element 130, the interaction being such that an excitation-emission relationship for the one or more optically readable structures interacting with the one or more proximal structures is different to an excitation-emission relationship for the one or more optically readable structures and the one or more proximal structures in isolation.

As discussed above, the proximal structures could be non-emitting structures, or other optically readable structures. The proximal structures could be formed in the same layer or matrix or similar as the optically readable structures, or could be located in a layer above or below the layer in which the optically readable structures 132 are present.

The optically readable security element 130 is readable to determine data indicative of an optical property of the optically readable security element using first emission electromagnetic radiation, emitted in response to excitation of the one or more optically readable structures 132

In use, deriving the information comprises deriving information from the determined data.

The optically readable structures 132 may be, or may be embedded within, a self-supporting layer of material. It is quite likely, however, that the optically readable structures 132 will be supported or otherwise provided on a backing layer or substrate 134.

A capping layer 136 might also be provided, to cover the layer of optically readable structures 132, for example to protect the optically readable structures 132, or to attempt to maintain or preserve a required excitation-emission relationship for the life of the optically readable security element 130.

As discussed above, the element 130 could be, or could be located as part of, a QR Code, a barcode, a hologram etc.

It should be noted that the electromagnetic radiation described herein, including use of the term "optical", does not imply that the radiation, excitation or emission is necessarily visible to a human eye. The invention might be implemented using visible, UV and IR wavelengths, for example. Visible might give the user some guidance, for example when undertaking measurements or readings. However, non-visible may be less invasive, or might actually allow the user to undertake a reading without the user, or a third party, visibly noticing that such a reading is taking place. This might allow the user some comfort, for example when testing for authenticity in a public environment, or this might allow for the reading to even take place without the user knowing, or without the user needing to see any visible signs of the measurement.

The excitation discussed above could be linear or non-linear. For example, it might well be that a single photon is not required, or not sufficient, to suitable excite an emitter. Multiple photons may be required. For example, many mobile telephones and tablets contain IR lasers for. Two or three photon absorption at the security element, with an IR source as the exciting device or component, could be used to excite an emitter (i.e. the photons have more than half or a third of the bandgap energy). Multi-photon processes aren't efficient at a quantum level, but such an implementation could still be practical in an everyday sense—e.g. using existing technologies, in existing readers.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of deriving information from an optically readable security element, the method comprising:
   optically reading the optically readable security element, the optically readable security element comprising one or more optically readable structures, optically readable in response to excitation of the one or more optically readable structures, the one or more optically readable structures being arranged to interact with one or more proximal structures of the optically readable security element, the interaction being such that an excitation-emission relationship for the one or more optically readable structures interacting with the one or more proximal structures, is different to an excitation-emission relationship for the one or more optically readable structures and the one or more proximal structures in isolation;
   the reading comprising:
       determining data indicative of an optical property of the optically readable security element using first emission electromagnetic radiation, emitted in response to first excitation of the one or more optically readable structures, and using second emission electromagnetic radiation, emitted by the one or more proximal structures in response to the first excitation of the one or more optically readable structure; and
       deriving the information from the determined data.

2. The method of claim 1, wherein the reading comprises determining data indicative of an optical property of the optically readable security element using third emission electromagnetic radiation, emitted in response to second, different, excitation of the one or more proximal structures.

3. The method of claim 1, wherein the one or more optically readable structures and the one or more proximal structures comprise, respectively, higher and lower energy optically readable structures.

4. The method of claim 3, wherein:
the first excitation is at or beyond a bandgap of the higher energy optically readable structures; or
the second excitation is at or beyond a bandgap of the lower energy optically readable structures, and below a bandgap of the higher energy optically readable structures.

5. The method of claim 3, wherein the higher energy structures have a higher energy bandgap than the lower energy structures.

6. The method of claim 1, wherein:
excitation is via excitation electromagnetic radiation; or
first and second, different, excitation is via first and second, different, excitation electromagnetic radiation.

7. The method of claim 6, wherein the first and second, different, excitation electromagnetic radiation is emitted via different excitation wavelengths.

8. The method of claim 1, wherein the difference in excitation-emission relationship as a result of the interaction is one or more of:
a different wavelength of emission;
a different intensity of emission; or
the one or more optically readable structures or the one or more proximal structures being caused to emit, or not emit.

9. The method of claim 1, further comprising:
before the reading, applying a strain field to the optically readable element, to change the interaction between the one or more optically readable structures and the one or more proximal structures, to change the excitation-emission response; or
after the reading, applying a strain field to the optically readable element, to change the interaction between the one or more optically readable structures and the one or more proximal structures, to change the excitation-emission response, and undertaking a subsequent reading.

10. The method of claim 1, wherein the derived information relates to verifying that:
the interaction comprises an energy transfer having taken place between the one or more optically readable structures and/or the one or more proximal structures;
the one or more optically readable structures and/or the one or more proximal structures is a quantum system and complex at the atomic scale; or
the optically readable security element is authentic.

11. The method of claim 1, wherein the one or more optically readable structures are arranged to interact with one or more proximal structures of the optically readable security element, due to the one or more optically readable structures and the one or more proximal structures of the optically readable security element being close enough for energy transfer to take place between the structures.

12. The method of claim 1, wherein the deriving comprises:
comparing the determined data with expected data.

13. The method of claim 12, wherein the expected data includes an expected emission wavelength or an expected intensity, and wherein the expected data is from a previously determined reading of an at least related optically readable security element, or from a reading of the one or more optically readable structures in isolation.

14. The method of claim 1, wherein:
the one or more optically readable structures comprises one or more continuous or discrete components exhibiting quantum mechanical confinement, each component being capable of emitting electromagnetic radiation linked to that quantum mechanical confinement, in response to the excitation, wherein the confinement of the one or more continuous or discrete components optionally confines in one or more of three, two or one spatial dimensions;
the one or more proximal structures are one or more optically readable structures;
the one or more proximal structures are one or more optically readable structures, including one or more continuous or discrete components exhibiting quantum mechanical confinement, each component being capable of emitting electromagnetic radiation linked to that quantum mechanical confinement, in response to the excitation, wherein the confinement of the one or more continuous or discrete components optionally confines in one or more of three, two or one spatial dimensions; or
the one or more proximal structures comprises one or more plasmonic nanostructures.

15. The method of claim 1, additionally comprising using the reading to determine a unique identifier for the optically readable security element.

16. The method of claim 15, further comprising:
using one or more excitation-emission relationships, for one or more optically readable structures, in one or more locations of the security element; or
using the derived information, for one or more optically readable structures, in one or more locations of the security element.

17. A system for deriving information from an optically readable security element, comprising:
an optical reader, for optically reading the optically readable security element, the optically readable security element comprising one or more optically readable structures, optically readable in response to excitation of the one or more optically readable structures, the one or more optically readable structures being arranged to interact with one or more proximal structures of the optically readable security element, the interaction being such that an excitation-emission relationship for the one or more optically readable structures interacting with the one or more proximal structures, is different to an excitation-emission relationship for the one or more optically readable structures and the one or more proximal structures in isolation;
the optical reader being arranged to determine data indicative of an optical property of the optically readable security element using first emission electromagnetic radiation, emitted in response to first excitation of the one or more optically readable structures, and using second emission electromagnetic radiation, emitted by the one or more proximal structures in response to the first excitation of the one or more optically readable structures; and
the system being arranged to derive the information from the determined data.

18. An optically readable security element from which information is derivable, comprising:
one or more optically readable structures, optically readable in response to excitation of the one or more optically readable structures;
the one or more optically readable structures being arranged to interact with one or more proximal structures of the optically readable security element, the interaction being such that an excitation-emission relationship for the one or more optically readable structures interacting with the one or more proximal structures, is different to an excitation-emission relationship for the one or more optically readable structures and the one or more proximal structures in isolation;

the optically readable security element being readable to determine data indicative of an optical property of the optically readable security element using first emission electromagnetic radiation, emitted in response to excitation of one or more optically readable structures, and using second emission electromagnetic radiation, emitted by the one or more proximal structures in response to the first excitation of the one or more optically readable structure;

in use, the deriving information comprising deriving the information from the determined data.

19. A method of deriving information from an optically readable security element, the method comprising:

optically reading the optically readable security element, the optically readable security element comprising one or more optically readable structures, optically readable in response to excitation of the one or more optically readable structures, the one or more optically readable structures being arranged to interact with one or more proximal structures of the optically readable security element, the interaction being such that an excitation-emission relationship for the one or more optically readable structures interacting with the one or more proximal structures, is different to an excitation-emission relationship for the one or more optically readable structures and the one or more proximal structures in isolation;

the reading comprising:

determining data indicative of an optical property of the optically readable security element using first emission electromagnetic radiation, emitted in response to first excitation of the one or more optically readable structures; and deriving the information from the determined data, wherein:

the one or more optically readable structures comprises one or more continuous or discrete components exhibiting quantum mechanical confinement, each component being capable of emitting electromagnetic radiation linked to that quantum mechanical confinement, in response to the excitation, wherein the confinement of the one or more continuous or discrete components optionally confines in one or more of three, two or one spatial dimensions;

the one or more proximal structures are one or more optically readable structures;

the one or more proximal structures are one or more optically readable structures, including one or more continuous or discrete components exhibiting quantum mechanical confinement, each component being capable of emitting electromagnetic radiation linked to that quantum mechanical confinement, in response to the excitation, wherein the confinement of the one or more continuous or discrete components optionally confines in one or more of three, two or one spatial dimensions; or the one or more proximal structures comprises one or more plasmonic nanostructures.

20. A system for deriving information from an optically readable security element, comprising:

an optical reader, for optically reading the optically readable security element, the optically readable security element comprising one or more optically readable structures, optically readable in response to excitation of the one or more optically readable structures, the one or more optically readable structures being arranged to interact with one or more proximal structures of the optically readable security element, the interaction being such that an excitation-emission relationship for the one or more optically readable structures interacting with the one or more proximal structures, is different to an excitation-emission relationship for the one or more optically readable structures and the one or more proximal structures in isolation;

the optical reader being arranged to determine data indicative of an optical property of the optically readable security element using first emission electromagnetic radiation, emitted in response to first excitation of the one or more optically readable structures; and the system being arranged to derive the information from the determined data, wherein:

the one or more optically readable structures comprises one or more continuous or discrete components exhibiting quantum mechanical confinement, each component being capable of emitting electromagnetic radiation linked to that quantum mechanical confinement, in response to the excitation, wherein the confinement of the one or more continuous or discrete components optionally confines in one or more of three, two or one spatial dimensions;

the one or more proximal structures are one or more optically readable structures;

the one or more proximal structures are one or more optically readable structures, including one or more continuous or discrete components exhibiting quantum mechanical confinement, each component being capable of emitting electromagnetic radiation linked to that quantum mechanical confinement, in response to the excitation, wherein the confinement of the one or more continuous or discrete components optionally confines in one or more of three, two or one spatial dimensions; or the one or more proximal structures comprises one or more plasmonic nanostructures.

21. An optically readable security element from which information is derivable, comprising:

one or more optically readable structures, optically readable in response to excitation of the one or more optically readable structures;

the one or more optically readable structures being arranged to interact with one or more proximal structures of the optically readable security element, the interaction being such that an excitation-emission relationship for the one or more optically readable structures interacting with the one or more proximal structures, is different to an excitation-emission relationship for the one or more optically readable structures and the one or more proximal structures in isolation;

the optically readable security element being readable to determine data indicative of an optical property of the optically readable security element using first emission electromagnetic radiation, emitted in response to excitation of one or more optically readable structures;

in use, the deriving information comprising deriving the information from the determined data, wherein:

the one or more optically readable structures comprises one or more continuous or discrete components exhibiting quantum mechanical confinement, each component being capable of emitting electromagnetic radiation linked to that quantum mechanical confinement, in response to the excitation, wherein the confinement of the one or more continuous or discrete components optionally confines in one or more of three, two or one spatial dimensions;

the one or more proximal structures are one or more optically readable structures;

the one or more proximal structures are one or more optically readable structures, including one or more continuous or discrete components exhibiting quantum mechanical confinement, each component being capable of emitting electromagnetic radiation linked to that quantum mechanical confinement, in response to the excitation, wherein the confinement of the one or more continuous or discrete components optionally confines in one or more of three, two or one spatial dimensions; or the one or more proximal structures comprises one or more plasmonic nanostructures.

* * * * *

UNITED STATES PATENT AND TRADEMARK OFFICE
CERTIFICATE OF CORRECTION

| | | |
|---|---|---|
| PATENT NO. | : 11,328,193 B2 | Page 1 of 1 |
| APPLICATION NO. | : 17/060294 | |
| DATED | : May 10, 2022 | |
| INVENTOR(S) | : Robert James Young et al. | |

It is certified that error appears in the above-identified patent and that said Letters Patent is hereby corrected as shown below:

In the Claims

Claim 17, Column 20, Line 53 reads "...optically readable structures; and the system being arranged..."

It should read "...optically readable structures; and using second emission electromagnetic radiation, emitted by the one or more proximal structures in response to the first excitation of the one or more optically readable structures; and the system being arranged..."

Claim 18, Column 21, Line 11 reads "...one or more optically readable structure, in use, the deriving information..."

It should read "...one more more optically readable structures, and using second emission electromagnetic radiation, emitted by the one or more proximal structures in response to the first excitation of the one or more optically readable structure; in use, the deriving information..."

Signed and Sealed this
Twenty-eighth Day of June, 2022

Katherine Kelly Vidal
*Director of the United States Patent and Trademark Office*